United States Patent
Patino Zapata et al.

(10) Patent No.: US 12,480,874 B2
(45) Date of Patent: Nov. 25, 2025

(54) PLASMONIC DEVICE, SYSTEM AND METHOD

(71) Applicant: Universidad de los Andes, Bogota D.C. (CO)

(72) Inventors: Edgar Javier Patino Zapata, Bogota (CO); Leidy Paola Quiroga Sanchez, Bogota (CO)

(73) Assignee: UNIVERSIDAD DE LOS ANDES, Bogota D.C. (CO)

( * ) Notice: Subject to any disclaimer, the term of this patent is extended or adjusted under 35 U.S.C. 154(b) by 106 days.

(21) Appl. No.: 17/161,195

(22) Filed: Jan. 28, 2021

(65) Prior Publication Data

US 2021/0190682 A1 Jun. 24, 2021

(51) Int. Cl.
*G01N 21/55* (2014.01)
*G01N 21/552* (2014.01)
*G02B 5/00* (2006.01)

(52) U.S. Cl.
CPC .......... *G01N 21/554* (2013.01); *G02B 5/008* (2013.01)

(58) Field of Classification Search
CPC ..... G02B 5/008; G01N 21/554; G01N 21/553
See application file for complete search history.

(56) References Cited

U.S. PATENT DOCUMENTS

| | | | |
|---|---|---|---|
| 6,504,651 B1 * | 1/2003 | Takatori | B82Y 20/00 359/638 |
| 2005/0270538 A1 * | 12/2005 | Meehan | G02F 1/195 356/445 |
| 2016/0178516 A1 * | 6/2016 | Abdulhalim | G01N 29/022 977/954 |

FOREIGN PATENT DOCUMENTS

| | | | |
|---|---|---|---|
| JP | 06167443 A | * | 6/1994 |
| JP | H06167443 A | * | 6/1994 |
| JP | 06265336 | * | 9/1994 |
| JP | 06265336 A | * | 9/1994 |
| JP | H06265336 | * | 9/1994 |

OTHER PUBLICATIONS

Fukuda (2017. Based Plasmonic Surface for Chemical Biosensing by the Attenuated Total Reflection Method. MRS Advances, 2(42 ), pp. 2303-2308 (Year: 2017).*

* cited by examiner

*Primary Examiner* — Uzma Alam
*Assistant Examiner* — Mohamed Doumbia
(74) *Attorney, Agent, or Firm* — LUCAS & MERCANTI, LLP

(57) ABSTRACT

A plasmonic device amplifies an optical signal of a sample positioned subsequently thereto comprises a high refraction index dielectric element, a low refraction index dielectric element with a modifiable width and a layer of metal. When light producing plasmon resonance is received at a dielectric metal interface, a plasmonic field is generated in the sample. A system comprises the plasmonic device, a holder for placing the sample, an optical circuit with a light source and a photodetector and rotatable supports for the plasmonic device. A magneto optical signal is produced according to an incident light angle, a distance of the plasmonic device and the sample and the inner width of a dielectric in the plasmonic device. A method obtains an amplified magneto optical signal from the sample, modifies an angle near a total reflection, adjusts distance of the sample to the plasmonic device or internal width of second dielectric such that it produces a maximum plasmonic field.

24 Claims, 16 Drawing Sheets

PLASMONIC DEVICE, SYSTEM AND METHOD

FIELD

The present disclosure generally refers to plasmonic techniques for use in optics and magneto optics.

In particular, the present disclosure proposes amplifying a magneto-optical signal as result of placing a sample in contact or close to a particular plasmonic device.

BACKGROUND

The interaction of electromagnetic field with electrons at metal dielectric interface leads to the so-called Surface Plasmon-Polariton (SPP) resonance. This is the result of the frequency and linear momentum match of the evanescent incident radiation and the electrons collective oscillation at the interface. Advantageously, SPPs enhance the magneto-optical activity of nano-structured or layered systems.

Such an enhancement can be used for magneto optical signals. In the prior art, two configurations are mainly used for optically producing SPP. The first is Otto's configuration rarely found in the literature. The second is Kretschmann's configuration most commonly used.

Both configurations have a layered structure and can be used to optically excite surface plasmon waves. These configurations produce a giant electric field or plasmonic field, at a layer of a material (sample) located around the plasmon resonance region. An important limitation of these configurations for real applications lies on the fact that said sample needs to be located internally. The sample is placed between two metallic layers, in the Kretschmann's configuration, which makes it impossible to separate it from the measuring device.

On the other hand, when simply using MOKE effect directly to study the magnetic properties, it demands the sample to be directly illuminated with the incident light. This is a further disadvantage. For instance, these configurations cannot be used in case of the sample being in the form of liquid, powder, micro or nano structures, as these disperse the light going out of the sample making very difficult to detect and measure its magnetic properties accurately.

Finally, just placing the sample around the plasmonic device adds an additional complication as this modifies the effective dielectric constant of the medium. Depending on the sample thickness, magnetic properties surface and nano structure, the resonance condition is modified, thereby affecting the linear momentum match of the evanescent incident radiation and the electrons collective oscillation at the interface.

SUMMARY

It would be desirable to overcome or at least mitigate the limitations found in the prior art related to the sample; in particular its location where magnetic materials are part of the plasmonic device and the modification of the effective dielectric constant that modifies the plasmon resonance of the structure. Also, it would be desirable to further improve signal amplification.

Thus the main aspect of the present disclosure is aimed at a plasmonic device capable of amplifying an optical signal of an external sample coupled to the device.

In an embodiment, the plasmonic device comprises a first dielectric element of a high refraction index. Following the first dielectric element, a second dielectric element of a low refraction index is arranged. The width of second dielectric element can be modified. Following the second dielectric element, a layer of metal is arranged. The sample is to be located near or in contact with the layer of metal. When incident light is received on the first dielectric element, a plasmon resonance can be produced at the interface region between the second dielectric element and the layer of metal. This leads to a plasmonic field generated in the sample. By modifying the width, the plasmonic field can be adjusted.

In some embodiments, the first dielectric element is typically a prism.

In some embodiments, second dielectric element may be air o vacuum and the plasmonic device may include a frame or support to hold the layer of metal separating it from the first dielectric element.

In other embodiments, the plasmonic device may also include additional components.

For instance, a third dielectric element of low refraction index and having a modifiable width can be arranged after the layer of metal to generate an additional plasmonic field in the sample.

For instance, in addition to the third dielectric element, a fourth third dielectric element of high refraction index can be arranged between the first and second dielectric elements.

Another aspect of the present disclosure is a system for detecting a magneto optical signal in a sample is also proposed. The system comprises a plasmonic device as those mentioned above and a holder for placing the sample, an optical circuit to emit a polarized light beam on the plasmonic device.

The system allows an indirect observation of the magnetic optic Kerr Effect (MOKE) enhanced by a plasmon resonance field generate at the plasmonic device with a sample located in contact with or close to said plasmonic device.

The system also comprises a rotatable support for placing the holder and the plasmonic device at a selectable angle with respect to the emitted light beam. The rotatable support facilitates obtaining a total reflection of the light on the plasmonic device. The optical circuit also includes a photodetector placed on a further rotatable support. Thus, the photodetector may detect light exiting from the plasmonic device. The magneto optical signal may be produced from the sample exposed to a plasmonic field generated by the plasmon resonance. Advantageously, the system can detect the magneto optical signal that is generated and also allows select the incident angle, the distance between the sample and the plasmonic device and even the inner structure of the plasmonic device itself by means of modifying width in a dielectric material in the plasmonic device.

In an embodiment, the system also includes one or more electromagnets for applying an external magnetic field. Depending on the electromagnet(s) field orientation, different types of signals can be produced. If the field orientation is perpendicular to the plane of incidence, a transversal magneto optical Kerr-Effect (TMOKE) signal is obtained. If parallel to the plane of incidence and to the external side of the plasmonic device, a longitudinal magneto optical Kerr-Effect (LMOKE) signal is obtained. If parallel to the plane of incidence and perpendicular to the external side of the plasmonic device, a perpendicular magneto optical Kerr-Effect (PMOKE) signal is obtained.

A further aspect of the present disclosure is a method for obtaining an amplified magneto optical signal from a sample using the plasmonic device as those mentioned above.

The method comprises placing the sample in a holder, setting an incident angle theta for a polarized light beam and detecting at a two theta angle the reflected light on a photodetector. Setting the distance between a metal layer internal surface and a first dielectric element of a plasmonic device by adjusting the width of a second dielectric.

The method further comprises applying a coarse adjustment and, optionally, a fine adjustment. In the coarse adjustment, a rotatable support and photodetector are used to produce a theta two theta scan reflectivity measurement. The rotatable support is coupled to the holder for varying the incident angle of the emitted light beam. On the other hand, the photodetector may detect the amount of reflected light. Thus, a total reflection of the polarized light beam can be reached. Then, by slightly increasing the incident angle over the total reflection angle, a minimum reflectivity can be detected with the photodetector. When the minimum reflectivity is achieved, a plasmonic field is generated which amplifies the magneto optical signal from the sample. The distance between the metal layer internal surface and the first dielectric is varied and a theta two theta reflectivity scan is performed. The former procedure is repeated self consistently until the minimum angle of reflectivity is found.

For the fine adjustment MOKE signal is obtained and the above theta two theta scan procedure is repeated until the maximum MOKE signal is found.

The present teachings also allow a better characterization and study of the MOKE signal as function of the incident light angle around and at the peak of plasmon resonance.

According to the present teachings, among many other possible applications, these techniques can improve standard MOKE characterization techniques including Magnetic Surface Microscopy, sensing of magnetic elements, detection of micro and nano particles, quality control and reading of memory storage devices and Magnetic Spectroscopy.

More in particular, retrieval of magnetic hysteresis loops, characterization of magnetic properties as function of magnetic field, detection of magnetic response as function of magnetic field and related.

BRIEF DESCRIPTION OF THE DRAWINGS

A series of drawings which aid in better understanding the disclosure and which are presented as non-limiting examples and are very briefly described below.

DETAILED DESCRIPTION

A set of embodiments of a device, a system and a method will be described in detail by reference to the appended drawings. It is to be understood that other embodiments are contemplated and may be made without departing from the scope or spirit of the present disclosure. The following detailed description, therefore, is not to be taken in a limiting sense.

Figure 1A:
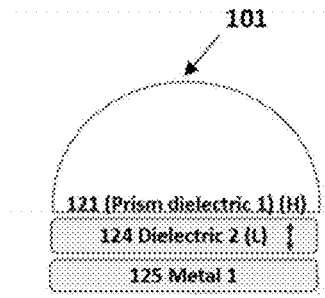
FIGS. 1A-1H illustrate different embodiments of a plasmonic device.

FIG. 1A schematically shows a structure of layers in an embodiment 101 of a device for amplifying an optical signal in a sample. From top to bottom there are a dielectric element of a high refractive index 121 in the form of a semi-spherical prism, a dielectric layer 124 of a low refraction index and a bottom layer of metal 125. The width of the dielectric layer 124 is modifiable. For instance, due to its piezoelectric or an elastic properties (e.g. polydimethylsiloxane, PDMS). A sample is to be positioned below the plasmonic device either in contact with the device or close to it. The upper element 121 receives light beam under certain conditions a plasmon resonance region may be produced.

Figure 1B:
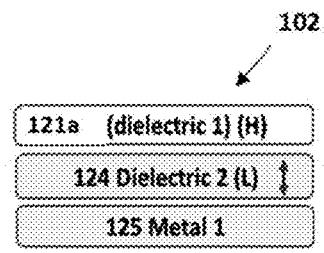

FIG. 1B schematically shows an embodiment 102 similar to FIG. 1A, the main difference lies in there is an upper dielectric element 121a that is not in form of a prism but of a layer. This embodiment saves space and weight. On the other hand, it requires to be optically coupled to an external prism (not shown in FIG. 1B) to be functional.

Figure 1C:
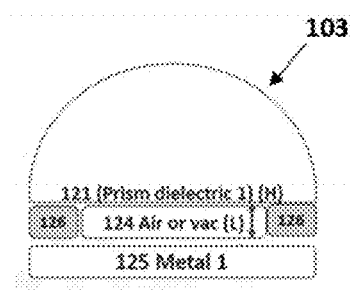

FIG. 1C schematically shows an embodiment 103 similar to FIG. 1B, the main difference lies in the dielectric layer 124 being gas, e.g. air, or vacuum instead of a non-gaseous material. This layer forms a gap between the prism element 121 and the metal layer 125. A support 126 is provided for the metal layer. This support 126 may be adjustable to modify the properties of the device, in particular, the formation of plasmon resonance.

Figure 1D:
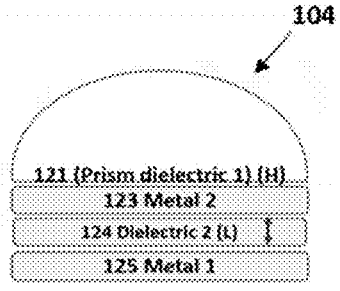

FIG. 1D schematically shows an embodiment 104 similar to FIG. 1A, the main difference lies in an additional metal layer 123 is provided below the upper dielectric element 121 and above the dielectric layer 124.

Figure 1E:
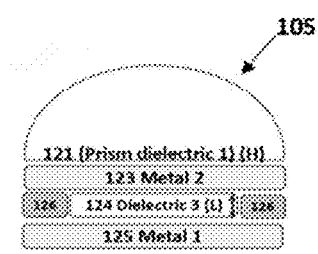

FIG. 1E schematically shows an embodiment 105 similar to FIG. 1D, the main difference lies in the dielectric layer 124 being gas, i.e. air, or vacuum instead of a non-gaseous material.

Figure 1F:
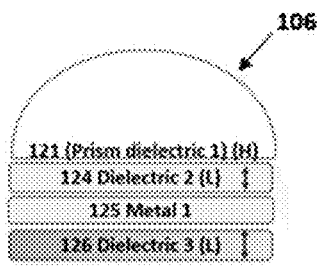

FIG. 1F schematically shows an embodiment 106 similar to FIG. 1A, the main difference lies in an additional dielectric element 126 of a low refraction index. The dielectric element 126 is in form of a layer and is placed on the bottom, below the layer of metal 125.

Figure 1G:
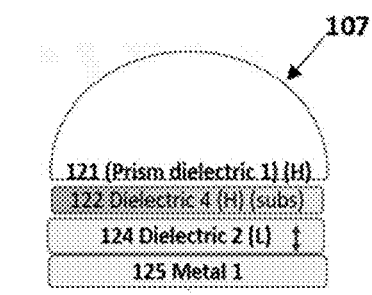

FIG. 1G schematically shows an embodiment 107 similar to FIG. 1A, the main difference lies in a further intermediate dielectric element 122 of a high refraction index. The intermediate dielectric element 122 is in form of a layer and is placed below the upper dielectric prism 121 of a high refractive index and above the dielectric layer 124 of a low refractive index. The bottom layer is also a layer of metal 125.

Figure 1H:
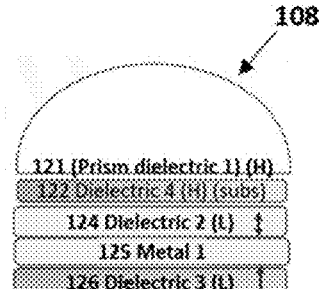

FIG. 1H schematically shows an embodiment 108 similar to FIG. 1F, the main difference lies in a further intermediate dielectric element 122 of a high refraction index. The intermediate dielectric element 122 is in form of a layer and is placed below the upper dielectric prism 121 of a high refractive index and above the dielectric layer 124 of a low refractive index. The bottom layer is also a dielectric layer 126 of a high refraction index.

The usual values for the refraction index in each of the dielectric elements are the following:

In FIGS. 1A-1C: For the upper dielectric element 121, preferably n≥1.5; for the intermediate dielectric element 124, 1≤n≤1.5.

In FIG. 1E: For the upper dielectric element 121, preferably n≥1.5; for the intermediate dielectric element 124, n~1.

In FIG. 1F: For the upper dielectric element 121, preferably n≥1.5; for the intermediate dielectric element 124, 1≤n≤1.5; for the bottom dielectric element 126, 1≤n≤1.5.

In FIG. 1G: For the upper dielectric element 121, preferably n~1.5; for the upper intermediate dielectric element 122, n≥1.5, for the lower intermediate dielectric element 124, 1≤n≤1.5.

In FIG. 1H: For the upper dielectric element 121, preferably n~1.5; for the upper intermediate dielectric element 122, n≥1.5, for the lower intermediate dielectric element 124, 1≤n≤1.5; for the bottom dielectric element 126, 1≤n≤1.5.

It is desirable to keep the difference of refractive indices between the high and low index materials of dielectric elements as high as possible. However it is possible to use slightly lower index of refraction for first dielectric element n<1.5, reducing such difference in exchange of lower performance.

For superior performance materials such as Zinc Selenide (ZnSe) or Rutile (TiO2) can be used as upper dielectric element with high index of refraction, when used in conjunction with low index of refraction materials.

Figure 2:
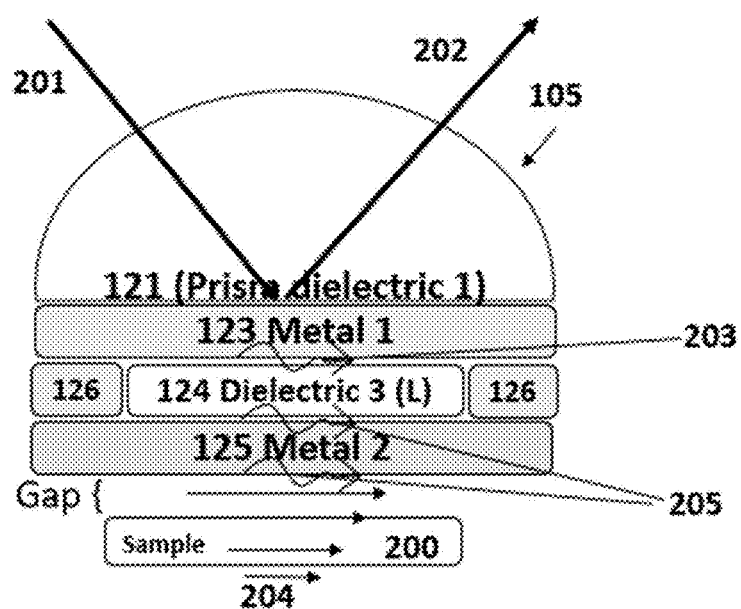
FIG. 2 illustrates a plasmonic generation using an embodiment of the plasmonic device.

FIG. 2 schematically shows the embodiment 105 of the device in FIG. 1E under operation with a sample 200 placed below and near (or in contact with) the bottom layer of metal 125. It suffices that the sample be magnetic. Due to the fact the incident light does not directly impact on the sample, it does not need to be solid or continuous or flat as required by conventional techniques.

The magneto optical Kerr effect, MOKE, describes the changes in intensity and polarization experienced by a light wave after being reflected from the surface of a material. Said material is exposed to an external magnetic field. The changes depend on the orientation of the magnetic moments of the material under the influence of the applied magnetic field and the plane of incidence.

When incident polarized light 201 is received with a certain angle on the dielectric prism 121, plasmon resonance regions 203, 205 are produced at each of the interfaces of dielectric and metal. The sample is also exposed to such giant plasmonic field 204 due to its proximity to the plasmonic device. This electric field is produced by collective surface charge oscillations at a metal dielectric interface. These oscillations, also known as Surface Plasmon-Resonance (SPR), are the result of coupling a parallel component of the wave vector of the charge oscillations and frequency between an external electric field and surface charges present in the metal.

The magneto optical response of a sample in the proximity to the plasmonic device can be enhanced as result of the presence of said giant electric field. Given that the magnetic sample is not directly shown with light it can be in different states of matter such as solid liquid, or powder phase or geometries such as nano structured samples.

Figures 3A, 3B, 3C:
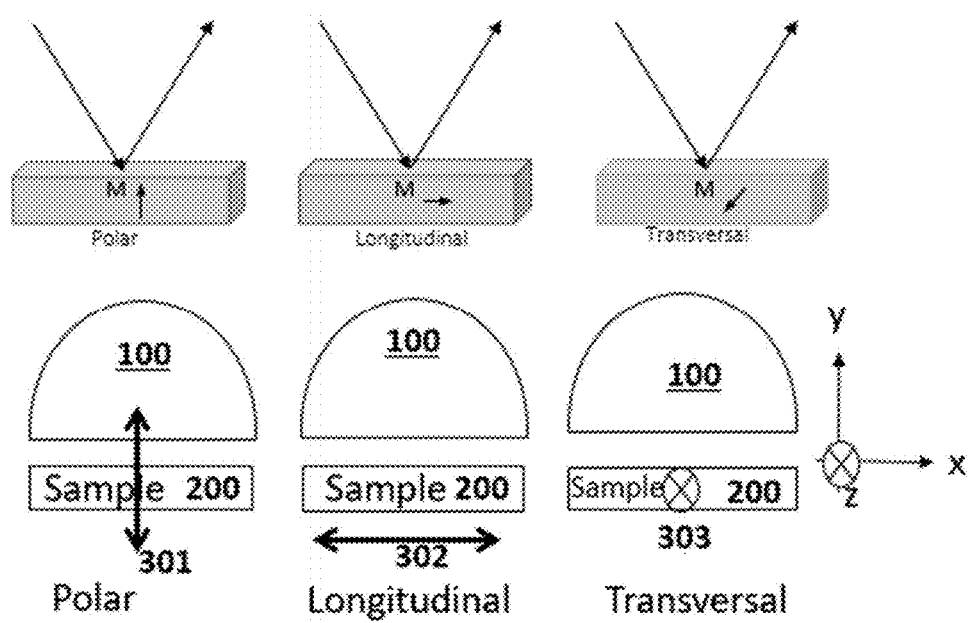
FIGS. 3A-3C illustrate different types of generation of magneto-optic plasmonic Kerr effects.
Figure 4:
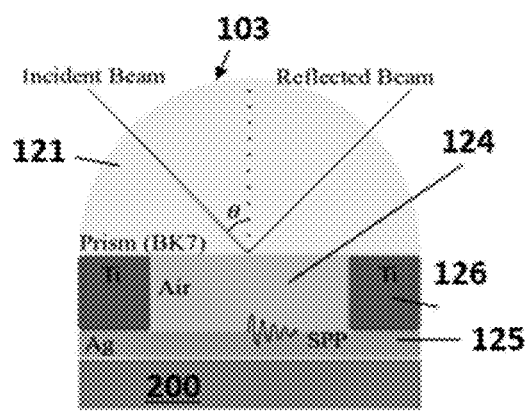
FIG. 4 illustrates an embodiment of a plasmonic device used in experimental tests.

FIGS. 3A-3C illustrate three different configurations according to the direction of an external magnetic field in relation to a device 100 representing anyone of the embodiments 101 to 108 previously described. When the magneto-optical Kerr effect, MOKE, is produced under an external magnetic field having a:

polar direction 301 as in FIG. 3A, a P-MOKE signal is obtained;

longitudinal direction 302 as in FIG. 3B, a L-MOKE signal is obtained;

transversal direction 303 as in FIG. 3C, a T-MOKE signal is obtained,

FIG. 4 is a schematical representation of an embodiment 103 in the Otto configuration used for experimental tests. It has been proved that a T-MOKE signal coming from a magnetic sample can be amplified 8 times or more.

The embodiment 103 includes a prism BK7 121, followed by an air gap 124 of ~300 nm of width and a layer of metal Ag 125 of 20 nm, followed by a sample 200 made of a layer of Co of 10 nm deposited on Si substrate i.e. the effective structure studied was prism/Air (~300 nm)//Ag (20 nm)/Co (10 nm)/Si (substrate). In this configuration several tests have been performed revealing a T-MOKE signal coming from the magnetic sample has been amplified about 8 times or more.

Figure 5A:
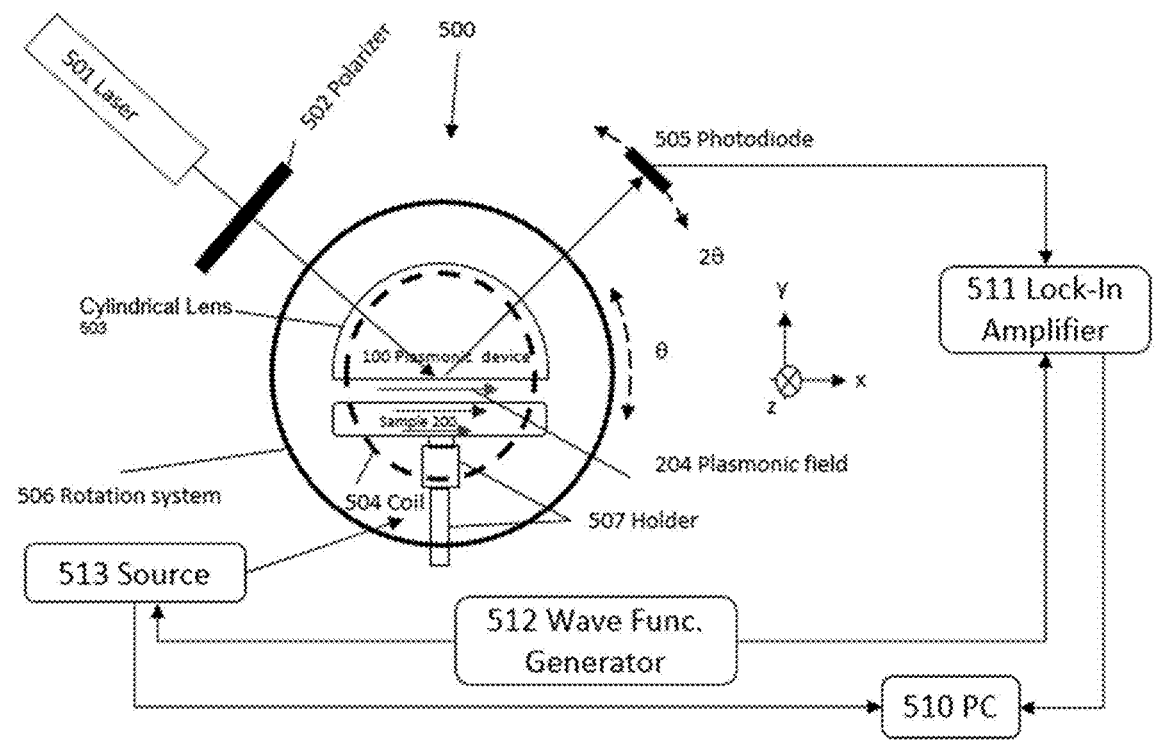
FIGS. 5A-5B and 5C illustrate schematic diagrams of two embodiments of a system according to the disclosed teachings.
Figure 5B:
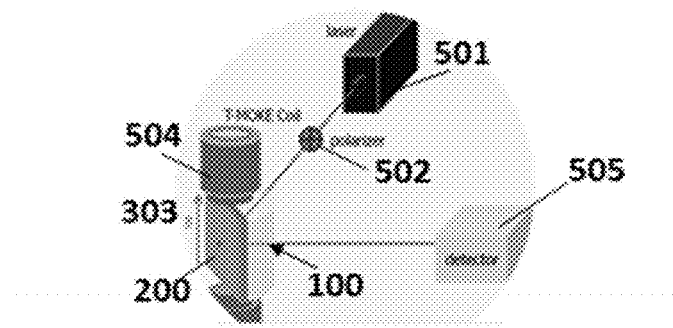
Figure 5C:
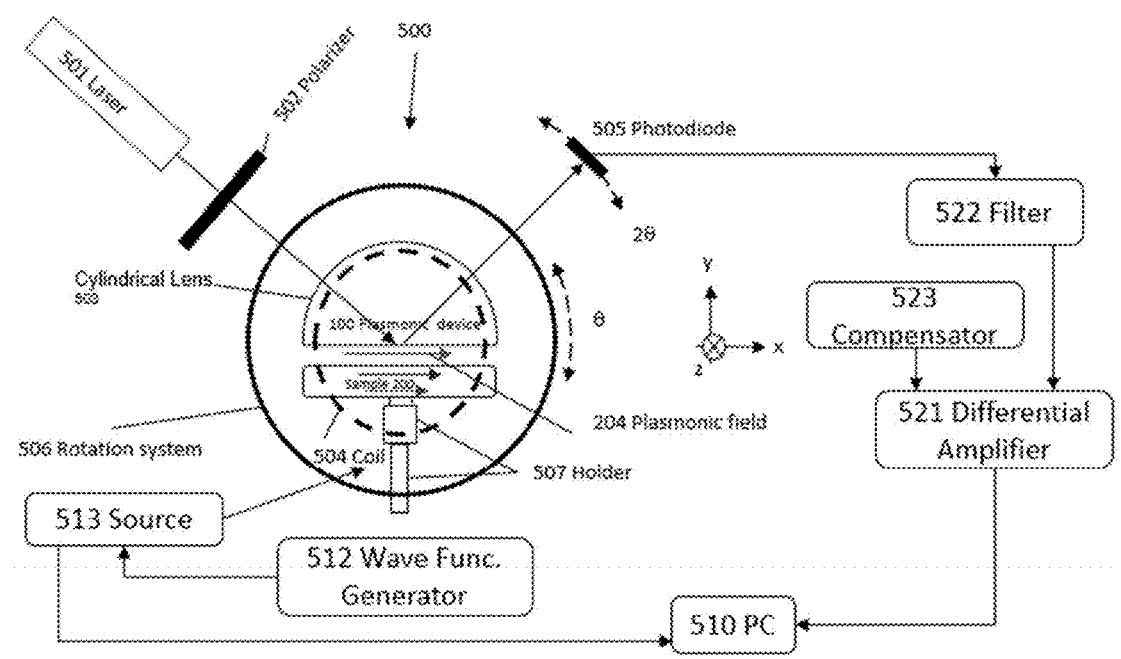

FIGS. 5A-5B and 5C shows two setups for finding a maximum amplification of a MOKE signal that have been used for the experimental tests. The system 500 allows an indirect observation of the magneto-optic Kerr effect (MOKE) enhanced by exciting a plasmon surface resonance near a sample 200.

FIG. 5A is a schematical representation of a top view along with FIG. 5B, which is a partial perspective view of an embodiment of a system 500 with a Lock-in technique.

The system 500 includes an optical circuit. On a side, a laser emitter 501 as a light source coupled to a polarizer 502. The light beam is directed to the plasmonic device 100. On the other side, part of the incident light beam is reflected and can be detected by a photodetector (photodiode) 505. The sample 200 is located in contact with, or close to, the plasmonic device 100. The system provides a holder 507 for a suitable positioning of said sample 200 in relation to the plasmonic device 100. For instance in an embodiment of FIG. 1C the holder allows to position the sample and at the same time to apply pressure thus changing the average width of the second dielectric.

To allow easily changing the angle of incident light beam, a rotation system 506 composed of two goniometers for placing the holder at a certain angle θ and detecting reflected light, using a photodetector 505, at an angle 2θ. When correctly aligned, the photodetector 505 detects light exiting from the plasmonic device 100.

A MOKE signal can be produced from the sample 200 when exposed to a plasmonic field that can be controlled by several factors, namely, the incident light beam angle, the distance between the sample 200 and the plasmonic device 100 and, modifiable structural features in the plasmonic device 100 (e.g. the width of an internal layer).

An oscillatory magnetic field 303 is applied via electromagnet or coil 504 driven by a power source 513 (e.g. KEPCO bipolar). The current through the coil 504 is varied periodically using an external reference signal supplied by a wave function generator 512. The sample experiences an alternating magnetic field where the magnetization is periodically flipped resulting in a square signal response detectable by the photodiode 505.

Small variations in the reflected light can be extracted with a Lock-in amplifier 511 in phase with the oscillatory magnetic field 303. The light variations serve to form a reflectivity signal solely as result of magnetic field 303 variations.

In this example, the direction of the magnetic field 303 that causes the magnetization changes in the sample, is normal to the plane of light incidence and is in the same plane of the sample 200. Thus the signal to be obtained is of a T-MOKE type as result of changes in the reflectivity of the incident light due the magnetic state of the sample 200.

Likewise shown by FIG. 3A-3C, a different alignment of the magnetic field 303 is also valid, so as to produce another kind of MOKE amplification such as PMOKE or LMOKE.

FIG. 5C is a schematical representation of a top view of another embodiment of a system 500 that alternatively uses a set of electronics so called hysteresis-technique.

The lock-in amplifier is replaced with several components. A low-pass filter 522 is used for pre-amplification. A compensator 523 matches a DC signal coming from the low-pass filter 522. A differential amplifier 521 multiplies several times the subtraction of the two signals from the filter 522 and from the compensator 523.

For this setup, the wave generator 512 produces a sinusoidal wave to control the power source 513 and thus the current that is fed in the coil 504.

For a particular example, the low-pass filter may have a cutoff frequency at 30 Hz, the coil may be controlled by a sinusoidal wave with frequency of 1 Hz, the gain of the differential amplifier may be 200. These values provide a low-noise AC signal coming from the photodiode.

A magnetic hysteresis loop is obtained by sweeping the magnetic field. The electromagnet and coil 504 serve for applying a sweeping magnetic field while reflectivity value is sensed by the photodetector 505.

The system presented in both figures allows the sample 200 be illuminated at θ angle while the photodetector 505 is at 2θ angle (so called θ-2θ configuration). At an angle greater than the total reflection angle, plasmon surface resonance may be excited thereby modifying optical behavior, such as an effect of reduction of reflected light. The detection of reflected light reduction allows the study the MOKE signal as function of angle around and at the plasmon resonance peak.

Figure 6:
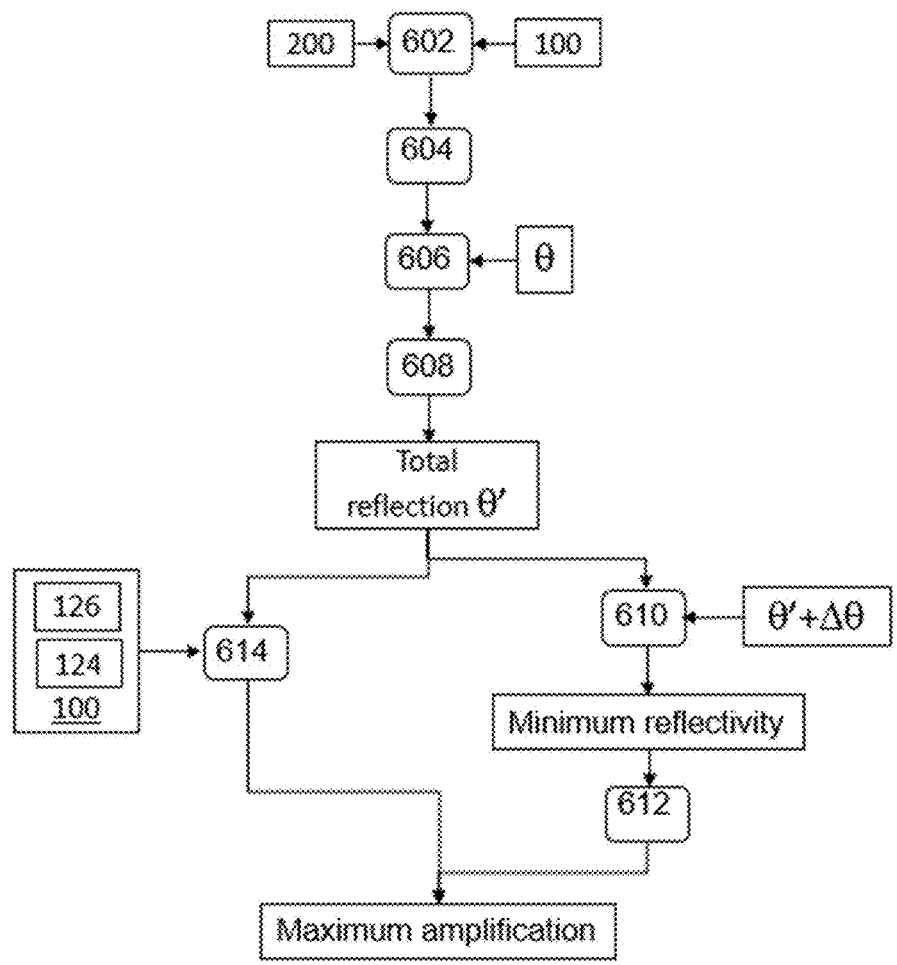
FIG. 6 is a flow diagram of steps of a method according to the disclosed teachings.

FIG. 6 schematically represents steps of an embodiment of a method for obtaining an amplified magneto optical signal from a sample. The method can be used in a system 500 as explained above with reference to FIGS. 5A-5C.

In a placing step 602, a sample 200 is placed at an adjustable distance with respect to a plasmonic device 100. In this case, firstly a distance is set. Other embodiments may allow for the distance be further modified during the method.

In an emitting step 604, an initial incident angle is set for a polarized light beam to be emitted on the plasmonic device 100.

In a varying step 606, the incident angle of the emitted light beam is progressively modified.

In a detecting step 608, a light beam reflected from the plasmonic device 100 is detected until a total reflection angle θ' producing a total reflection of the polarized light beam is obtained. This value θ' is important since it indicates the proximity of a maximum amplification condition.

In a tuning step 610, the total reflection angle θ' is increased until a minimum reflectivity is reached. By doing so, amplification of the magneto optical signal is optimized since plasmon resonance around the minimum reflectivity. This step 610 can be viewed as a reflectivity vs angle scan.

The above sequence of steps 606, 608 and 610 can be considered a coarse adjustment and permits quickly finding an enhanced amplification of a magneto-optical signal from the sample 200. In particular, to a MOKE signal.

Optionally, several supplementary steps may be carried out for a fine adjustment that enables further amplification of the magneto optical signal. Such a fine adjustment may be achieved as follows.

In a sample distance adjusting step 612, distance of the sample 200 with respect to the plasmonic device 100 is modified, until a maximum plasmonic field is generated.

An additional o alternative fine adjustment to 612 can also be obtained by a core distance adjusting step 614 in the plasmonic device 100, where the width of an internal dielectric element is modified until a maximum plasmonic field is generated. Thus the inner structure of the plasmonic device 100 is changed. By analyzing reflectivity vs dielectric width, (e.g. using an amplifier 521) a further amplification can be obtained. If the plasmonic device 100 includes a dielectric layer with piezoelectric properties, a voltage may be applied to modify its width.

Figure 7A:
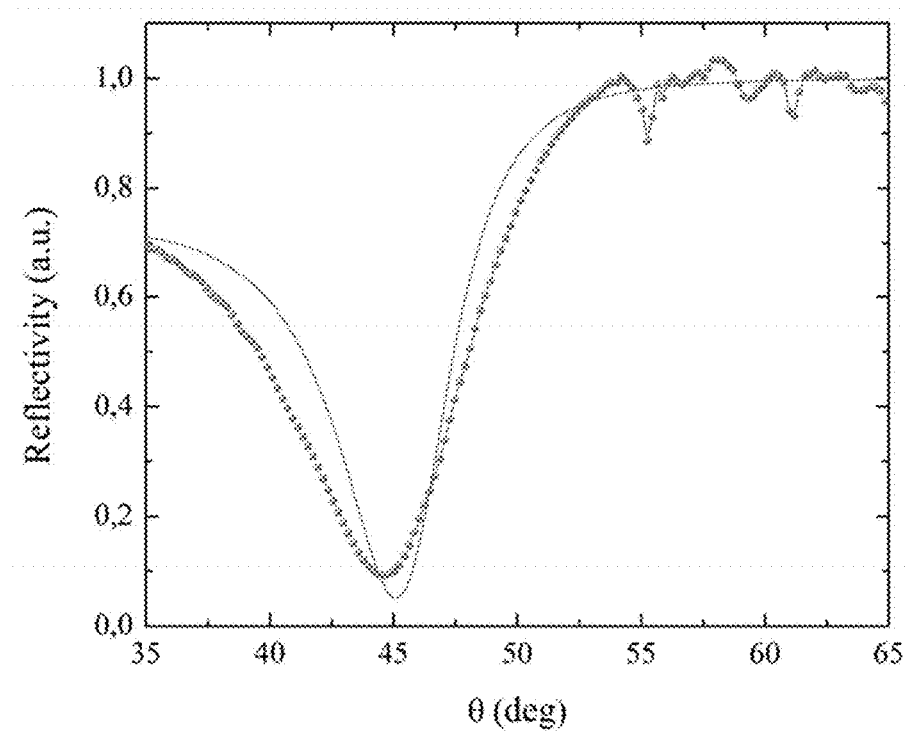
FIGS. 7A-7B show angular reflectivity and TMOKE signals obtained in experimental tests and theoretical prediction for a sample in Otto configuration.
Figure 7B:
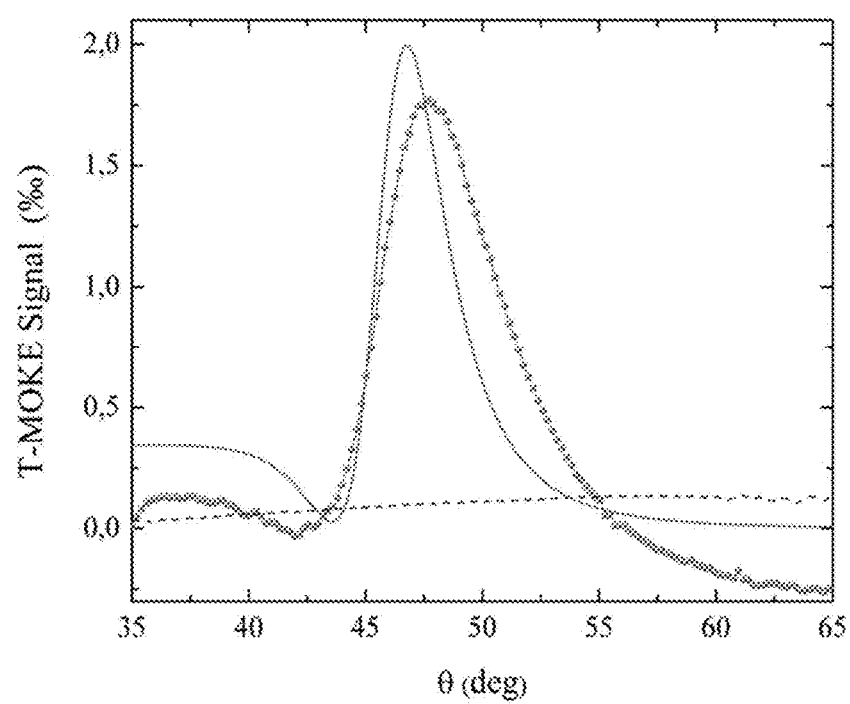

FIGS. 7A and 7B show angular reflectivity and TMOKE signals obtained in experimental tests depicted as solid spheres in the Otto configuration while solid line indicates theoretical prediction. FIG. 7A correspond to reflectivity measures while FIG. 7B shows the variation of the TMOKE signal as function of angle. These results are compared with the theoretical prediction depicted in solid line.

Figure 8:
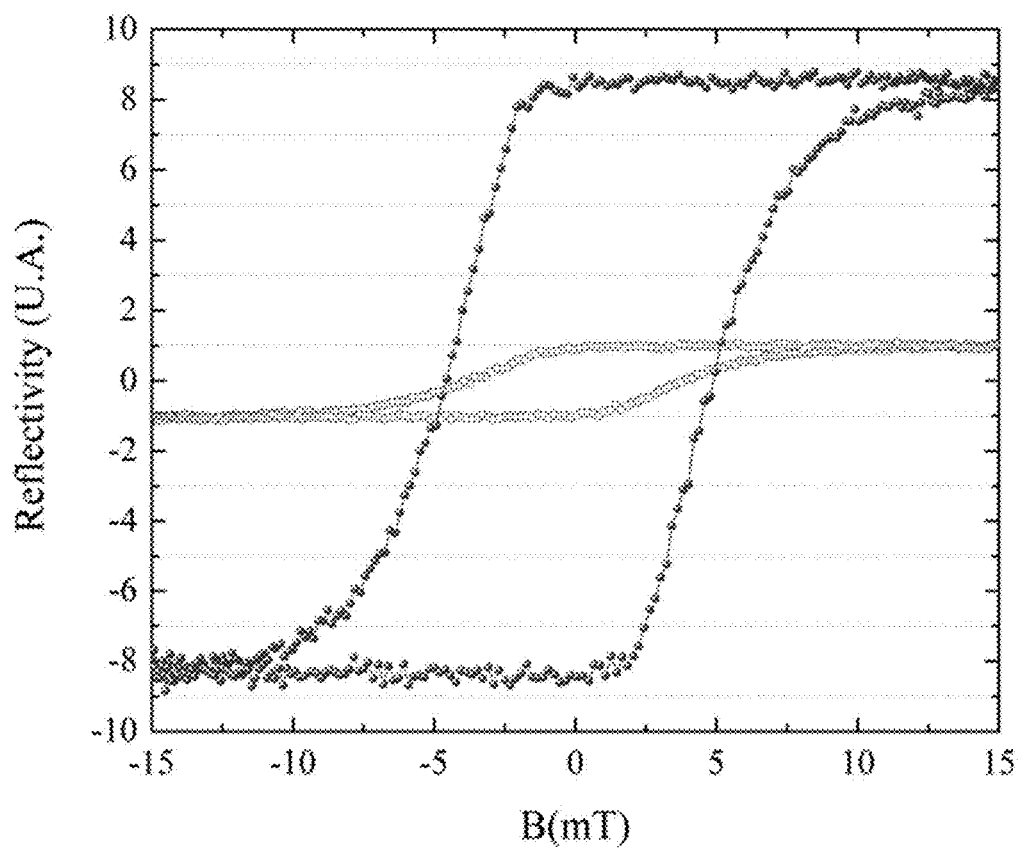
FIG. 8 shows amplification obtained in experimental tests of the magnetic hysteresis loops for the sample under the influence of plasmon resonance fields and in the absence of plasmon fields.

FIG. 8 shows the actual amplification of the magnetic hysteresis loops obtained in experimental tests for the sample under the influence of plasmon resonance fields (solid spheres) and in the absence of plasmon fields (hollow spheres) where the sample has been directly illuminated with light.

Figure 9A:
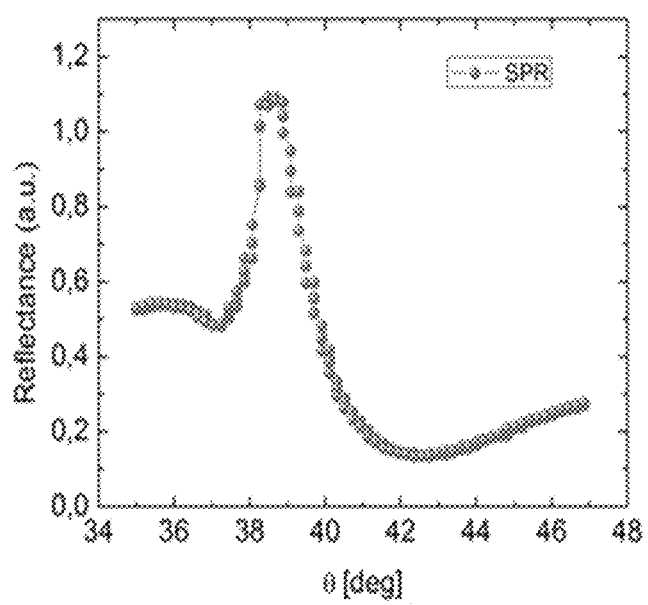
FIGS. 9A-9B show reflectance and corresponding TMOKE signal vs angle that demonstrates how it changes as function of the angle of incidence.
Figure 9B:
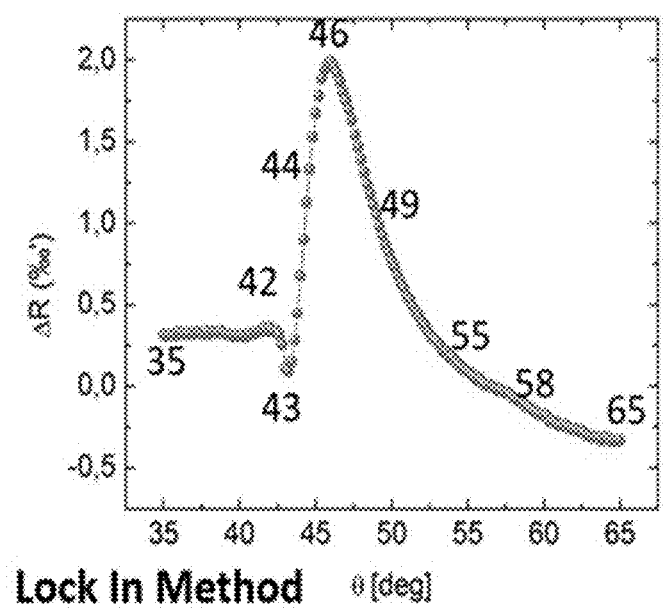

FIGS. 9A and 9B show the reflectance and corresponding TMOKE signal vs angle that depicts how it changes as function of the angle of incidence with a Lock-in technique.

FIGS. 10A-10G show a sequence of how the hysteresis technique is applied in a sequence of seven reflection angles θ. It can be seen how the reflectance and magnetic field B change in dependence upon the value of reflection angle θ.

Figure 10A:
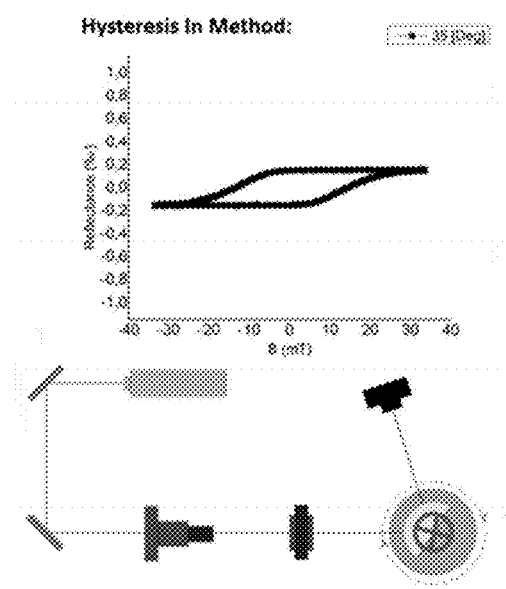
FIGS. 10A-10G illustrate different hysteresis loops found at each angle during variation step for finding a maximum amplification based on a hysteresis technique.
Figure 10B:
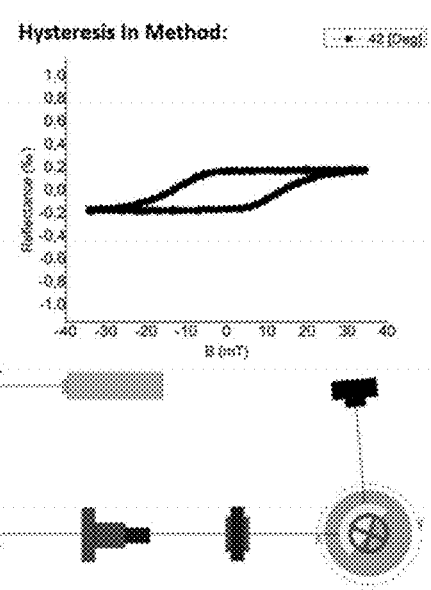
Figure 10C:
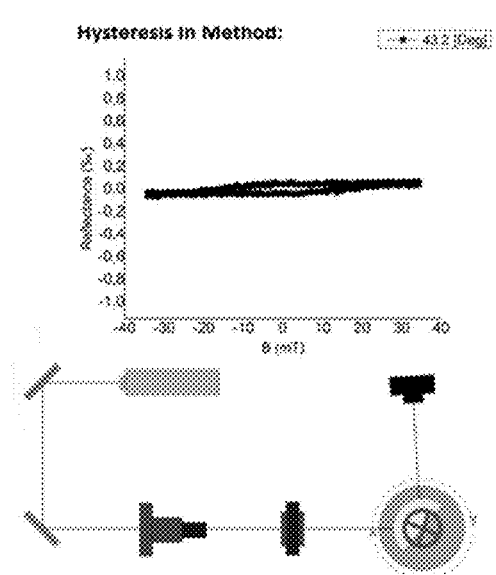
Figure 10D:
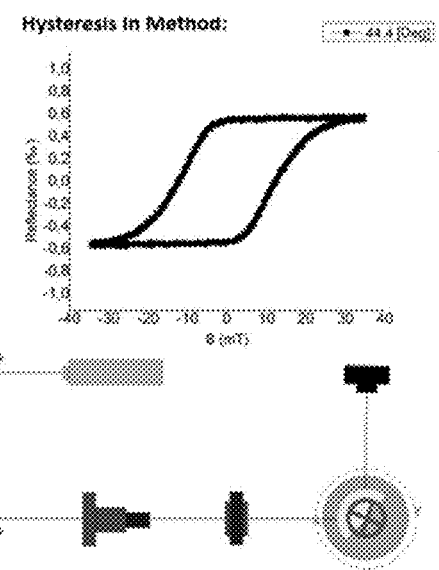
Figure 10E:
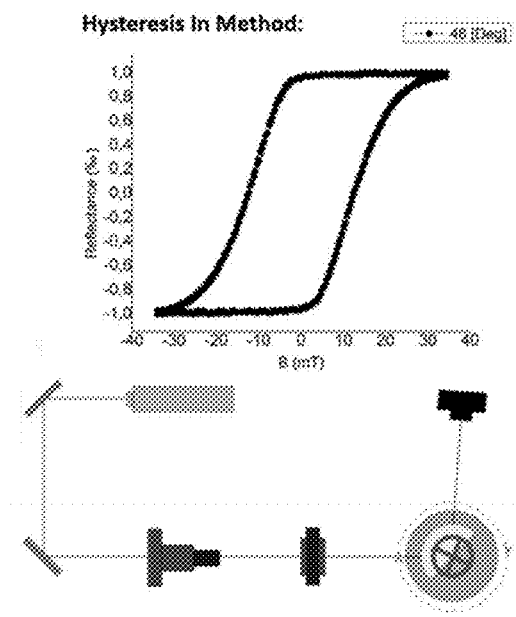
Figure 10F:
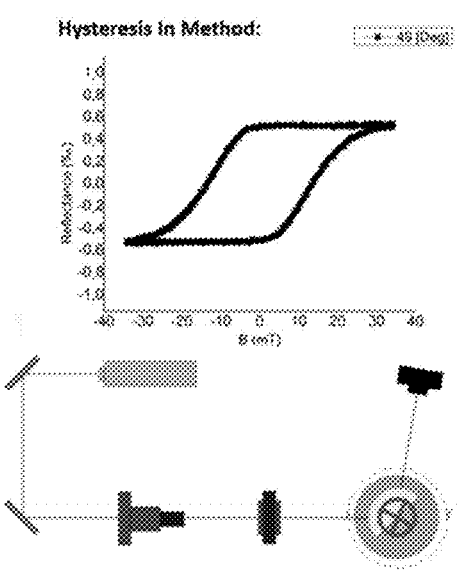
Figure 10G:
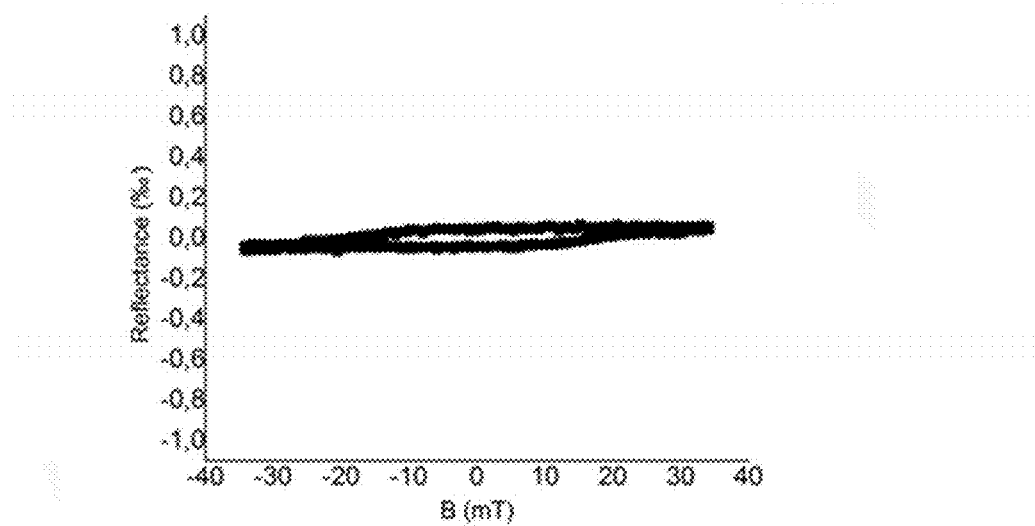
Figure 10G:
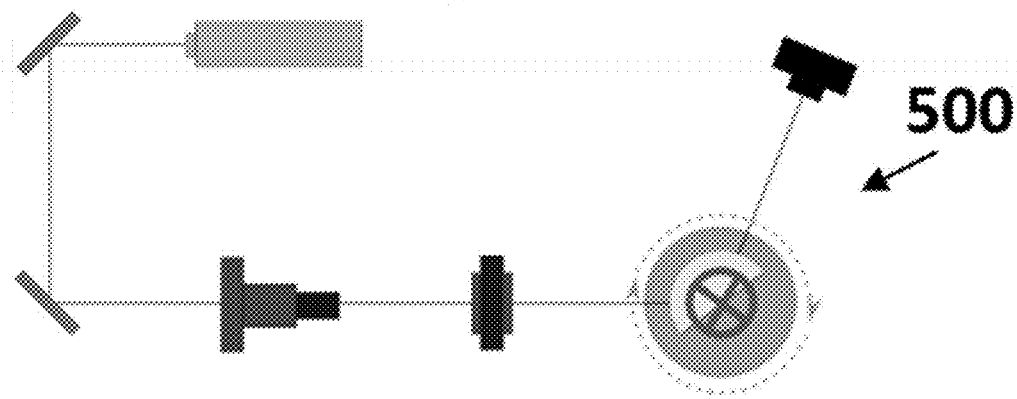

At angles of 43.2° and 58.4° in FIG. 10C and FIG. 10G there is a drastic reduction of the reflectance for any magnetic field.

On the other hand, at an angle of 46° in FIG. 10E there is a great increase of the reflectance for any magnetic field. This particular behavior is used for finding a maximum amplification.

It is to be understood that the specific embodiments and applications of the concepts disclosed herein are merely illustrative. Numerous modifications may be made to the present teachings without departing from the spirit and scope of the disclosure.

The invention claimed is:

1. A plasmonic device for amplifying an optical signal of a sample comprising:
a first dielectric element of a high refraction index, the first dielectric element comprising a first surface for receiving light and a second opposite surface;
a second dielectric element of a low refraction index, the second dielectric element comprising a first surface and a second opposite surface, defining a width therebetween, wherein the width is modifiable and wherein the first surface of the second dielectric element is arranged proximate the second surface of the first dielectric element;
a layer of metal, the layer of metal comprising an internal side proximate the second surface of the second dielectric element, and an external opposite side;

a width adjustable support placed between the second surface of the first dielectric element and the internal side of the layer of metal, such that the distance between the first dielectric element and the layer of metal is adjustable;

a third dielectric element of a low refraction index, externally arranged to the layer of metal, the third dielectric element comprising an internal side proximate the external side of the layer of metal, and an opposite external side distant the layer of the metal, and wherein the width between internal side and external side is modifiable; and a fourth dielectric element of a high refraction index, the fourth dielectric element comprising a first surface and a second opposite surface, wherein the first surface of the fourth dielectric element is arranged proximate the second surface of the first dielectric element, and wherein the second surface of the fourth dielectric element is proximate the first surface of the second dielectric element, wherein the plasmonic device is configured to receive light producing plasmon resonance at a region interface of the second dielectric element and the layer of metal and to generate a plasmonic field in the sample, wherein the plasmonic device is further configured to receive light producing plasmon resonance at a region interface of the third dielectric element and the layer of metal and to generate an additional plasmonic field in the sample, wherein the first dielectric element is a prism, and wherein the second dielectric element comprises a piezoelectric material having a width modifiable by applying a voltage.

2. The plasmonic device of claim 1, wherein the second dielectric element is gas or vacuum formed therebetween.

3. The plasmonic device of claim 1, further comprising an additional layer of metal internally arranged between the first dielectric element and the second dielectric element, the additional layer of metal being a second layer of metal.

4. The plasmonic device of claim 3, further comprising a width adjustable support for the metal layer and the additional metal layer, wherein the second dielectric element is gas or vacuum formed therebetween.

5. A plasmonic device for amplifying an optical signal of a sample comprising:

a first dielectric element of a high refraction index, the first dielectric element comprising a first surface for receiving light and a second opposite surface;

a second dielectric element of a low refraction index, the second dielectric element comprising a first surface and a second opposite surface, defining a width therebetween, wherein the width is modifiable and wherein the first surface of the second dielectric element is arranged proximate the second surface of the first dielectric element;

a layer of metal, the layer of metal comprising an internal side proximate the second surface of the second dielectric element, and an external opposite side;

a width adjustable support placed between the second surface of the first dielectric element and the internal side of the layer of metal, such that the distance between the first dielectric element and the layer of metal is adjustable;

a third dielectric element of a high refraction index, the third dielectric element comprising a first surface and a second opposite surface, wherein the first surface of the third dielectric element is arranged proximate the second surface of the first dielectric element, and wherein the second surface is proximate the first surface of the second dielectric element, wherein the plasmonic device is configured to receive light producing plasmon resonance at a region interface of the second dielectric element and the layer of metal and to generate a plasmonic field in the sample, wherein the first dielectric element is a prism, and wherein the second dielectric element comprises a piezoelectric material having a width modifiable by applying a voltage.

6. The plasmonic device of claim 1, wherein the first dielectric element comprises Zinc Selenide (ZnSe) or Rutile (TiO2).

7. A system for detecting a magneto optical signal of a sample comprising:

a plasmonic device for amplifying an optical signal of an external sample comprising:

a first dielectric element of a high refraction index, wherein the first dielectric element is a prism comprising a first surface for receiving light and a second opposite surface;

a second dielectric element of a low refraction index, the second dielectric element comprising a first surface and a second opposite surface, defining a width therebetween, wherein the width is modifiable, wherein the first surface of the second dielectric element is arranged proximate the second surface of the first dielectric element;

a layer of metal, the layer of metal comprising an internal side proximate the second surface of the second dielectric element, and an external opposite side;

a width adjustable support placed between the second surface of the first dielectric element and the internal side of the layer of metal, such that the distance between the first dielectric element and the layer of metal is adjustable;

a third dielectric element of a low refraction index, externally arranged to the layer of metal, the third dielectric element comprising an internal side proximate the external side of the layer of metal, and an opposite external side distant the layer of the metal, and wherein the width between internal side and external side is modifiable; and a fourth dielectric element of a high refraction index, the fourth dielectric element comprising a first surface and a second opposite surface, wherein the first surface of the fourth dielectric element is arranged proximate the second surface of the first dielectric element, and wherein the second surface of the fourth dielectric element is proximate the first surface of the second dielectric element, wherein the plasmonic device is configured to receive light producing plasmon resonance at a region interface of the second dielectric element and the layer of metal, wherein the plasmonic device is further configured to receive light producing plasmon resonance at a region interface of the third dielectric element and the layer of metal and to generate an additional plasmonic field in the sample, wherein the first dielectric element is a prism, and wherein the second dielectric element comprises a piezoelectric material having a width modifiable by applying a voltage, the system further comprising:

a holder for placing the sample, wherein the holder is configured to set an adjustable distance of the sample with respect to the plasmonic device;

an optical circuit comprising:
- a light source and a polarizer, so as to emit a polarized light beam;
- a first rotatable support for placing the holder and the plasmonic device at a selectable incident angle with respect to the light beam, so as to allow obtaining a total reflection of the polarized light beam on the plasmonic device;
- a photodetector for detecting light exiting from the plasmonic device; and
- a second rotatable support for placing the photodetector at a selectable exiting angle with respect to the light exiting from the plasmonic device;

wherein a magneto optical signal is produced from the sample exposed to a plasmonic field generated by the plasmon resonance, wherein the magneto optical signal is controlled by the incident angle, the distance of the sample with respect to the plasmonic device and/or the second dielectric width.

8. The system of claim 7, further comprising a magneto optical setup comprising an electromagnet for applying an external magnetic field having one of the following orientations: an orientation perpendicular to the plane of incidence thereby producing a transversal magnetic optic Kerr effect, TMOKE, signal, or an orientation parallel to the plane of incidence and to the external opposite side of the layer of metal of the plasmonic device thereby producing a longitudinal magnetic optic Kerr effect, LMOKE, signal, or parallel to the plane of incidence and perpendicular to the external opposite side of the layer of metal of the plasmonic device thereby producing a perpendicular magnetic optic Kerr effect, PMOKE, signal.

9. The system of claim 7, wherein the second dielectric element comprises a elastic material and wherein the second dielectric element width is modifiable by applying an external pressure.

10. A method for obtaining an amplified magneto optical signal from a sample using the system of claim 7 comprising the steps of:
- placing the sample in the holder;
- setting an incident angle for a polarized light beam on the external surface of the plasmonic device and emitting the polarized light beam;
- applying a coarse adjustment by:
  - varying, with a rotatable support coupled to the holder, the incident angle of the emitted light beam;
  - detecting, with a photodetector, a corresponding reflected light beam intensity;
  - obtaining, based on the reflected light beam intensity, a total reflection angle producing a total reflection of the polarized light beam on the internal surface of the first dielectric element;
  - increasing the incident angle over the total reflection angle until the minimum reflectivity is reached, thereby generating a plasmonic field; and
- producing an amplification of the magneto optical signal from the sample.

11. The method of claim 10, further comprising the step of applying a fine adjustment by:
- modifying the incident angle over the total reflection angle until a maximum plasmonic field is generated; and/or
- varying the distance of the sample with respect to the plasmonic device until a maximum plasmonic field is generated;

and producing an additional amplification of a magneto optical signal from the sample.

12. The method of claim 10, further comprising the step of applying a fine adjustment by: varying the width of a second dielectric element comprised in the plasmonic device by applying a pressure or voltage until a maximum plasmonic field is generated; and
producing an additional amplification of a magneto optical signal from the sample.

13. The method of claim 10, further comprising a step of sweeping an external magnetic field produced by a magneto optical setup over the sample and producing a magnetic hysteresis loop thereof.

14. The method of claim 13, wherein the external magnetic field orientation is selected among transversal, parallel, or longitudinal thereby producing a TMOKE signal, PMOKE signal, or LMOKE signal respectively.

15. A plasmonic device for amplifying an optical signal of a sample comprising:
- a first dielectric element of a high refraction index, the first dielectric element comprising a first surface for receiving light and a second opposite surface;
- a second dielectric element of a low refraction index, the second dielectric element comprising a first surface and a second opposite surface, defining a width therebetween, wherein the width is modifiable and wherein the first surface of the second dielectric element is arranged proximate the second surface of the first dielectric element;
- a layer of metal, the layer of metal comprising an internal side proximate the second surface of the second dielectric element, and an external opposite side;
- a width adjustable support placed between the second surface of the first dielectric element and the internal side of the layer of metal, such that the distance between the first dielectric element and the layer of metal is adjustable, wherein the second dielectric element is gas or vacuum formed therebetween;
- a third dielectric element of a low refraction index, externally arranged to the layer of metal, the third dielectric element comprising an internal side proximate the external side of the layer of metal, and an opposite external side distant the layer of the metal, and wherein the width between internal side and external side is modifiable;
- a fourth dielectric element of a high refraction index, the fourth dielectric element comprising a first surface and a second opposite surface, wherein the first surface of the fourth dielectric element is arranged proximate the second surface of the first dielectric element, and wherein the second surface of the fourth dielectric element is proximate the first surface of the second dielectric element;
- an additional layer of metal internally arranged between the first dielectric element and the second dielectric element, the additional layer of metal being a second layer of metal,
- wherein the plasmonic device is configured to receive light producing plasmon resonance at a region interface of the second dielectric element and the layer of metal and the second layer of metal, and to generate a plasmonic field in the sample,
- wherein the plasmonic device is further configured to receive light producing plasmon resonance at a region interface of the third dielectric element and the layer of metal and to generate an additional plasmonic field in the sample, and wherein the first dielectric element is a prism.

16. The plasmonic device of claim 15, wherein the second dielectric element comprises an elastic material having a width modifiable by applying external pressure.

17. The plasmonic device of claim 15, wherein the second dielectric element comprises a piezoelectric material having a width modifiable by applying a voltage.

18. The plasmonic device of claim 15, further comprising a width adjustable support for the metal layer and the additional metal layer, wherein the second dielectric element is gas or vacuum formed therebetween.

19. A plasmonic device for amplifying an optical signal of a sample comprising:
   a first dielectric element of a high refraction index, the first dielectric element comprising a first surface for receiving light and a second opposite surface;
   a second dielectric element of a low refraction index, the second dielectric element comprising a first surface and a second opposite surface, defining a width therebetween, wherein the width is modifiable and wherein the first surface of the second dielectric element is arranged proximate the second surface of the first dielectric element;
   a layer of metal, the layer of metal comprising an internal side proximate the second surface of the second dielectric element, and an external opposite side;
   a width adjustable support placed between the second surface of the first dielectric element and the internal side of the layer of metal, such that the distance between the first dielectric element and the layer of metal is adjustable, wherein the second dielectric element is gas or vacuum formed therebetween;
   a third dielectric element of a high refraction index, the third dielectric element comprising a first surface and a second opposite surface, wherein the first surface of the third dielectric element is arranged proximate the second surface of the first dielectric element, and wherein the second surface is proximate the first surface of the second dielectric element;
   an additional layer of metal internally arranged between the first dielectric element and the second dielectric element, the additional layer of metal being a second layer of metal,
   wherein the plasmonic device is configured to receive light producing plasmon resonance at a region interface of the second dielectric element and the layer of metal and the second layer of metal, and to generate a plasmonic field in the sample,
   wherein the plasmonic device is further configured to receive light producing plasmon resonance at a region interface of the third dielectric element and the layer of metal and to generate an additional plasmonic field in the sample, and
   wherein the first dielectric element is a prism.

20. The plasmonic device of claim 15, wherein the first dielectric element comprises Zinc Selenide (ZnSe) or Rutile (TiO2).

21. A system for detecting a magneto optical signal of an external sample comprising:
   a plasmonic device for amplifying an optical signal of an external sample comprising:
      a first dielectric element of a high refraction index, wherein the first dielectric element is a prism comprising a first surface for receiving light and a second opposite surface;
      a second dielectric element of a low refraction index, the second dielectric element comprising a first surface and a second opposite surface, defining a width therebetween, wherein the width is modifiable and wherein the first surface of the second dielectric element is arranged proximate the second surface of the first dielectric element;
      a layer of metal, the layer of metal comprising an internal side proximate the second surface of the second dielectric element, and an external opposite side;
      a width adjustable support placed between the second surface of the first dielectric element and the internal side of the layer of metal, such that the distance between the first dielectric element and the layer of metal is adjustable, wherein the second dielectric element is gas or vacuum formed therebetween;
      a third dielectric element of a low refraction index, externally arranged to the layer of metal, the third dielectric element comprising an internal side proximate the external side of the layer of metal, and an opposite external side distant the layer of the metal, and wherein the width between internal side and external side is modifiable;
      a fourth dielectric element of a high refraction index, the fourth dielectric element comprising a first surface and a second opposite surface, wherein the first surface of the fourth dielectric element is arranged proximate the second surface of the first dielectric element, and wherein the second surface of the fourth dielectric element is proximate the first surface of the second dielectric element;
      an additional layer of metal internally arranged between the first dielectric element and the second dielectric element, the additional layer of metal being a second layer of metal,
      wherein the plasmonic device is configured to receive light producing plasmon resonance at a region interface of the second dielectric element and the layer of metal and the second layer of metal,
      wherein the plasmonic device is further configured to receive light producing plasmon resonance at a region interface of the third dielectric element and the layer of metal and to generate an additional plasmonic field in the sample, and
      wherein the first dielectric element is a prism,
   the system further comprising:
      a holder for placing the sample, wherein the holder is configured to set an adjustable distance of the sample with respect to the plasmonic device;
      an optical circuit comprising:
      a light source and a polarizer, so as to emit a polarized light beam;
      a first rotatable support for placing the holder and the plasmonic device at a selectable incident angle with respect to the light beam, so as to allow obtaining a total reflection of the polarized light beam on the plasmonic device;
      a photodetector for detecting light exiting from the plasmonic device; and
      a second rotatable support for placing the photodetector at a selectable exiting angle with respect to the light exiting from the plasmonic device;

wherein a magneto optical signal is produced from the sample exposed to a plasmonic field generated by the plasmon resonance, wherein the magneto optical signal is controlled by the incident angle, the distance of the sample with respect to the plasmonic device and/or the second dielectric width.

22. The system of claim 21, further comprising a magneto optical setup comprising an electromagnet for applying an external magnetic field having one of the following orientations: an orientation perpendicular to the plane of incidence thereby producing a transversal magnetic optic Kerr effect, TMOKE, signal, or an orientation parallel to the plane of incidence and to the external opposite side of the layer of metal of the plasmonic device thereby producing a longitudinal magnetic optic Kerr effect, LMOKE, signal, or parallel to the plane of incidence and perpendicular to the external opposite side of the layer of metal of the plasmonic device thereby producing a perpendicular magnetic optic Kerr effect, PMOKE, signal.

23. The system of claim 21, wherein the second dielectric element comprises a piezoelectric material and wherein the second dielectric element width is modifiable by applying a voltage.

24. The system of claim 21, wherein the second dielectric element comprises an elastic material and wherein the second dielectric element width is modifiable by applying an external pressure.

* * * * *